April 28, 1942. L. W. DYER ET AL 2,280,898
CAPACITOR TRIPPING DEVICE FOR CIRCUIT BREAKERS
Filed July 14, 1939
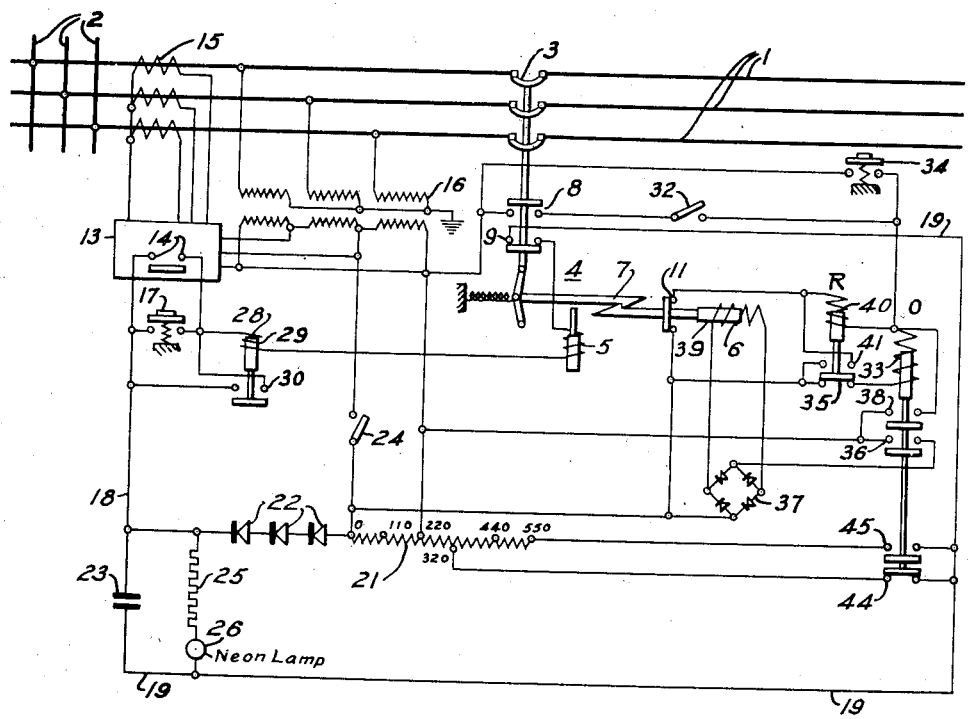
WITNESSES:
INVENTORS
Lloyd W. Dyer and
Gayne D. Gamel.
BY
ATTORNEY Patented Apr. 28, 1942

2,280,898

UNITED STATES PATENT OFFICE 2,280,898

CAPACITOR TRIPPING DEVICE FOR CIRCUIT BREAKERS

Lloyd W. Dyer, Wilkinsburg, and Gayne D. Gamel, Verona, Pa., assignors to Westinghouse Electric & Manufacturing Company, East Pittsburgh, Pa., a corporation of Pennsylvania Application July 14, 1939, Serial No. 284,443

16 Claims. (Cl. 175—294)

Our invention relates to a novel source of tripping energy for energising the shunt tripping coil of a circuit breaker, according to a novel system and means which we have designated as "capacitor tripping." Our invention relates to means for deriving the electrical energy for the tripping coil of a circuit breaker from a line-voltage potential-transformer and a rectifier, the line, in which the main contacts of the circuit breaker are connected, being an alternating-current line. The rectifier makes it possible to utilize an ordinary direct-current tripping coil which operates by being energized with a very large direct current for a very brief period of time.

It is very desirable to derive the tripping energy from the line-voltage, in stations which are not already provided with a reliable auxiliary source of direct-current voltage, in order to avoid the expense of providing and maintaining such an auxiliary direct-current source. Prior to our present invention, however, attempts to utilize the line-voltage as a source of tripping-energy have not been altogether satisfactory, due mainly to the fact that line-voltage drops to quite low values during severe fault-conditions, at which times it is necessary to be able to quickly and reliably trip the circuit breaker in order to disconnect the faulted line from the rest of the transmission system.

This disadvantage, due to abnormally low line-voltages, makes itself felt, not only in the initial tripping-operation, when the circuit breaker is first tripped out, in order to clear the fault, but, since many circuit breakers are provided with automatic reclosing means, usually, although not always, associated with a trip-free operation of the breaker mechanism, it is necessary, also, to have an ample and reliable source of tripping energy for the purpose of instantly retripping if the line is still faulted when the circuit breaker is reclosed, and here, again, the very presence of the fault-condition constitutes a hazard in regard to insufficient available tripping-voltage for the second tripping-operation.

It has been apparently proposed heretofore notably in the Swedish Patent No. 68,377, dated October 8, 1925, although the description in the Swedish patent is not altogether clear, to utilize a capacitor which is permanently connected in shunt relation to a transformer-and-rectifier source of unidirectional-current voltage which is responsive to the line-voltage. However, the Swedish system did not provide means for promptly disconnecting the trip-coil during the tripping stroke of the circuit breaker. On the contrary, the Swedish system suggested the utilization of the capacitor to energize a switchboard signalling-means to show that the circuit breaker had been tripped, thus apparently maintaining a drain upon the capacitor, and thus making it well-nigh impossible, in any economical system, to recharge the capacitor in time to retrip the breaker in the event of a reclosure of the breaker on a faulted line.

It is an object of our invention to overcome the above-mentioned difficulties by providing a capacitor tripping system in which the trip-coil is almost instantly disconnected from the capacitor during the tripping stroke of the breaker, so that the recharging operation of the capacitor may immediately recommence.

It is a still further object of our invention to utilize such a capacitor-tripping method in a rapid, automatically reclosing circuit-breaker system, in which it is quite essential that the voltage on the capacitor-energized tripping-bus shall be very quickly restored after a discharge of the capacitor, it being understood that the capacitor voltage is a direct function of the amount of charge on or in the capacitor.

It is a still further object of our invention to provide means for temporarily increasing the charging-rate of the capacitor, during the recharging period.

With the foregoing and other objects in view, our invention consists in the apparatus, parts, combinations, systems and methods hereinafter described and claimed, and illustrated in the accompanying drawing, the single figure of which is a diagrammatic view of circuits and apparatus illustrating our invention in a preferred form of embodiment.

Our invention is illustrated as being utilized in connection with a three-phase line 1 which is adapted to be connected and disconnected to and from a three-phase power-bus 2, through the main contacts of a circuit breaker 3 which is controlled by a mechanism 4 comprising a trip-coil 5 and a closing-coil 6. The illustrated mechanism is of any of the well-known trip-free types, this trip-free feature being very schematically indicated by means of a latch 7, without any details as to the usually complicated retrieving means and other refinements which are utilized in the actual construction thereof. The circuit breaker is shown as being provided with two auxiliary switch-contacts 8 and 9 which are respectively closed and opened during the opening-stroke of the breaker, and a mechanism-contact 11 which is closed when the mechanism is in its fully closed position, and which is actuated at some time during the movement of the closing-mechanism. The circuit breaker 3 and the mechanism 4 are, or may be, of a conventional well-known type.

In the illustrated embodiment of our invention, we also show the utilization of a conventional quick-acting fault-responsive relaying-equipment which is schematically represented by a rectangle 13 and a protective-relay contact 14, this protective relaying-equipment being suitably energized from the line-current and the line-voltage by means of a bank of line-current transformers 15 and a bank of line-energized potential-transformers 16, respectively; the line-current transformers being connected in series with the line 1, and the potential-transformers being connected in shunt-relation to the line on one side of the main contacts of the circuit breaker 3, preferably, as shown, on the bus side of the circuit breaker, so as to obtain potential when the circuit breaker is open.

Connected in shunt to the protective-relay contact 14, in the illustrated embodiment of our invention, is a push-button 17. The closure of either the relay-contact 14 or the push-button 17 is utilized to complete a circuit energizing the trip-coil 5 from an auxiliary unidirectional-current bus which is indicated by the terminal-conductors 18 and 19, respectively.

The means for energizing the auxiliary bus 18—19 constitutes the principal novel feature of our invention. To this end, we derive a line-voltage-responsive alternating-current voltage, preferably from the bus side of the circuit breaker, in order to have voltage available when the circuit breaker is open. This line-derived voltage may be conveniently tapped off of one of the secondary phases of the potential-transformers 16, as by means of an auxiliary auto-transformer 21; and the alternating-current voltage thus obtained is applied to the unidirectional-current auxiliary bus 18—19 through any suitable asymetrically conducting rectifying means such as the contact-rectifiers 22, so that the auxiliary bus 18—19 is supplied with unidirectional current at a voltage which is dependent upon the line-voltage.

The auxiliary unidirectional-current bus 18—19 is permanently shunted by a capacitor 23 which is thus charged to the normal voltage of the auxiliary bus, this voltage having a predetermined ratio with respect to the normal line-voltage of the line 1. When a fault suddenly occurs somewhere on the alternating-current transmission system, the line-voltage may be suddenly reduced to a small percentage of its normal value, but the auxiliary unidirectional-current bus 18—19 is substantially prevented from discharging back into the auto-transformer 21, under such conditions, by the rectifier 22.

For the protection of the operating personnel, it is desirable that the charge should not be maintained on the capacitor 23 for an indefinitely long period after the plant has been shut down, as by opening the breaker 3 and also by opening an auxiliary switch 24 for the purpose of killing or deenergizing the auxiliary bus 18—19. It is desirable, therefore, to provide a high resistance 25, which may be of the order of a megohm or more, shunted across the capacitor 23, so as to discharge said capacitor in any desired predetermined time, such as a minute or more. In accordance with our invention, it is very essential however, that said capacitor-discharging resistance 25 shall discharge the capacitor only very slowly, so that the capacitor does not lose any material part of its voltage, say not more than 25% of its voltage, within a certain predetermined time, such as 7 seconds, during which it is desired to maintain a tripping-voltage on the bus 18—19 after the occurrence of a dead short-circuit on the line 1.

It is also very desirable to provide a positive indication of the existence of voltage, or of an adequate tripping-voltage, on the auxiliary bus 18—19, and, to this end, we have shown a tiny neon lamp 26 connected in series with the high capacitor-discharging resistance 25, said lamp being of such size that it will remain lighted only so long as the voltage across the terminals 18—19 of the capacitor 23 is sufficient for tripping purposes, or at least as high as some other predetermined value. By our connection of the neon lamp 26 in series with the capacitor-discharging resistance 25, as distinguished from being, for example, in shunt thereto, we thus prevent the neon lamp itself from constituting a relatively low-resistance capacitor-discharging device which would make it impossible to maintain an adequate charge on the capacitor 23 for a predetermined time, such as 7 seconds, after a deenergization of the auto-transformer 21.

The auxiliary bus 18—19 is utilized only as a source of tripping-energy and hence, except for the very high discharging-resistance 25, of the order of a megohm or more, the auxiliary bus 18—19 is normally unloaded. As a consequence, the rectifier 22 which supplies the bus 18—19 with unidirectional current from the alternating-current source may be of the nature of a trickle-charger supplying only a very small fraction of an ampere of current to the auxiliary bus 18—19, at all times, notwithstanding the fact that the tripping-coil 5 may take a momentary flow of several amperes from the capacitor 23, in order to trip the circuit breaker.

The tripping operation is initiated by the closure, either of the manually operated push-button 17 or of the automatically operated protective relay-contact 14, either one of which will connect the tripping-coil 5 across the auxiliary bus 18—19, causing the tripping-coil to partially short-circuit the capacitor 23, so as to momentarily withdraw a relatively large current therefrom.

The relatively large tripping-current, drawn by the tripping-coil 5, is of such value as to discharge the capacitor 23 in a fraction of a second, thus dissipating the voltage on the tripping-bus 18—19 because the trickle-charging rectifier 22 can supply only a very small current. Because of this rapid dissipation of the tripping voltage, we do not have the usual problem of interrupting the heavy tripping-current, as when the trip-coil was energized (as heretofore) from an ordinary tripping-source of adequate power-capacity, such as a storage battery. Nevertheless, in accordance with our invention, we regard it as important to interrupt the flow of the tripping-current as soon as possible, so that we will discharge the capacitor 23 to no greater extent than is absolutely necessary, and also so that we can immediately recommence the trickle-charging of the capacitor 23 through the rectifier 22. The object of this prompt interruption of the tripping current is thus to bring about a restoration of the voltage on the tripping-bus 18—19 as soon as possible, in order that there may be available a suitable tripping-voltage for again tripping-out the breaker, in case the breaker should be immediately reclosed either by hand or by automatic reclosing means.

In order to interrupt the tripping-current discharge of the capacitor 23, thus recommencing the trickle-current recharging thereof, we utilize the auxiliary switch-contact 9, which has been utilized heretofore in series with the trip-coil 5 when the trip-coil has been energized from an auxiliary source having a large reserve-capacity, such as a storage battery, or a generator, or a direct-current power-bus, although the auxiliary switch 9 has not been utilized heretofore, to our knowledge, in connection with a trip-coil 5 which has been energized from a capacitor which discharges itself in an extremely short time, so that, so far as overheating the trip-coil 5 is concerned, or even protecting the tripping contacts 14 and 17 against burning, there would be no particular reason for interrupting the discharge-current through the trip-coil.

As previously explained, the auxiliary switch 9 opens during the opening-stroke of the circuit breaker, and preferably this opening of the auxiliary switch 9 is effected at an early point in the opening-stroke of the circuit breaker. When it is realized that modern circuit breakers commonly effect a complete tripping operation within as little as 3 cycles after the initial energization of the trip-coil, on the basis of a 60-cycle line, it will be perceived that the tripping-current is permitted to flow for only an extremely small fraction of a second before it is interrupted by the auxiliary switch-contact 9.

The particular trip-circuit which is illustrated also contains the usual contactor 28 which has an operating-coil 29 which is serially connected in the tripping-circuit, and a make-contact 30 which is utilized as a holding-contact in parallel with the initiating contacts 14 and 17.

The particular system illustrated in the drawing also embodies automatic means for instantly reclosing the circuit breaker 3 after it has been tripped open. To this end, we utilize the auxiliary-switch 8, which is connected in series with a switch 32 which may be either manually operated or automatically controlled in any desired manner, as by means of an operation-counter (not shown). The auxiliary-switch 8 closes sometime during the opening-stroke of the breaker, and energizes the actuating coil 33 of an operating-relay O; or this relay can be operated, if desired, by means of a push-button 34 which is connected in shunt to the switches 8 and 32. The circuit of the actuating coil 33 of the operating-relay O is completed through a back-contact 35 of a releasing-relay R, the energy for the actuating-coil 33 being obtained from the alternating-current secondary-terminals of one of the potential-transformers 16. As soon as the operating-relay O picks up, it closes a make-contact 36 which energizes the closing-coil 6 from the afore-said alternating-current secondary-terminals, preferably through a rectifier-bridge 37 so that a direct-current closing-coil or solenoid 6 may be utilized. The actuation of the operating-relay O also closes a second make-contact 38 which is utilized as a holding-contact, by-passing the initiating contacts 8 or 34.

In the trip-free mechanism which is very schematically indicated in the drawing, the operation is such that when the circuit breaker is tripped by actuating the latch 7 by means of the energization of the tripping-coil 5, the main circuit-breaker contacts will open freely and quickly, and the rest of the mechanism will follow such opening-movement, or will be "retrieved," to utilize the technical term, in a more leisurely fashion, if the word "leisurely" can be properly applied to an operation which is so fast that it cannot be followed with the eye. At any rate, immediately after the circuit breaker opens, even commencing before the completion of the opening of the main circuit-breaker contacts, the parts of the operating mechanism are "retrieved," in which operation the core 39 of the closing-coil 6 moves out, away from the solenoid 6, until it becomes relatched to the moving elements of the circuit-breaker. Thus, when the closing-coil 6 is energized, it draws in, powerfully, upon its core 39, and recloses the breaker. The retrieving operation just described is the normal operation of a conventional trip-free circuit breaker, several types of which have long been well-known in the art.

The mechanism-responsive auxiliary-switch 11 is thus opened at the beginning of the opening-stroke of the core 39 of the closing-coil 6, and this auxiliary-switch 11 does not close again until nearly the end of the closing-stroke of the mechanism. When this auxiliary-switch 11 closed, it is utilized to energize the actuating coil 40 of the releasing-relay R, which thereupon opens its back-contact 35 and deenergizes the operating relay O. At the same time, the releasing-relay closes a front-contact 41 which is utilized as a holding-contact in shunt with the auxiliary-switch 11, so as to seal in the releasing-relay and prevent pumping of the breaker. When the operating-relay O is thus deenergized, by the opening of the back-contact 35 of the releasing-relay R, the operating-relay O immediately drops out, opening its front-contacts 36 and 38. The opening of the front-contact 36 deenergizes the closing-coil 6 and the serially connected closing-rectifier 37. It will be noted that the normally open relay-contact 36 is in series with the alternating-current input-circuit of the closing-rectifier 37, which is thus utilized for only short-time intermittent service, being energized only during the brief times when the circuit-breaker is reclosing. The releasing relay R is deenergized upon the opening of the circuits through the contacts 33, 8, 32 and 34, thus restoring the parts to the normal positions which they occupied in the initial closed position of the circuit breaker.

In accordance with one of the features of our invention, the auxiliary-switch 9 is utilized in the tripping-circuit for almost instantly disconnecting the tripping-coil 5 from the capacitor 23 so as to facilitate the prompt restoration of voltage on the tripping-bus 18—19, and this feature of my invention is particularly useful in an installation in which automatic instantaneous reclosing-means are utilized, such as the operations of the operating and releasing relays O and R which have been described as occurring under the initiation of the automatic switch 8.

In accordance with another feature of our invention, which is sometimes quite important, particularly in very fast-operating automatic reclosing systems, we provide means for temporarily causing the recharging-operation of the capacitor 23 to proceed at an accelerated rate, during the time when the circuit breaker is reclosing, in order that a substantially full normal voltage may be restored to the capacitor 23, and hence to the auxiliary or tripping-bus 18—19, by the time that the circuit-breaker 3 is reclosed, so that, if a fault should still persist on the transmission system, the automatic protective relaying-equipment 13—14 may again instantly trip the breaker. In order to accomplish the temporary acceleration of the recharging operation of the capacitor 23, after a tripping-operation of the breaker 3, we have illustrated a certain specific mechanism, although we are not by any means limited to this particular means for accomplishing the stated function.

In the illustrated embodiment of our invention, the operating-relay O is provided with two additional contacts 44 and 45, the contact 44 being a back-contact and the contact 45 being a front-contact, these two contacts being utilized to change the taps on the auto-transformer 21 so as to change the alternating-current charging-voltage from its normal value of say 320 volts, to a higher value, say 550 volts, as long as the operating relay O is energized, which is to say, as long as the closing coil 6 is energized. Thus, at the very moment when the operating-relay O energizes the closing-coil 6, it applies nearly double voltage on the capacitor 23, through the rectifier 22; and at the very moment when the operating-relay O deenergizes the closing-coil 6, at substantially the end of the closing-stroke of the mechanism, the operating-relay O also restores the normal charging-voltage conditions to the capacitor 23.

From the foregoing description of the construction and operation of a preferred form of embodiment of our invention, it will thus be seen that we have provided a very reliable and efficient means for energizing the trip-coil of a circuit breaker from the line-voltage, without going to the expense of a storage battery or motor-generator set for supplying the tripping-energy, and without suffering the previously experienced handicap in regard to the failure of an adequate source of tripping-energy, either for the initial tripping-operation, or for the re-tripping-operation after a reclosure of the breaker.

We desire it to be understood, however, that our illustration and description of a preferred form of embodiment of our invention is merely intended to be illustrative of the principles thereof and is not to be taken in an absolutely limiting sense, as many changes may be made by those skilled in the art, by way of substitutions, additions and omissions, without departing from the essential spirit of our invention, particularly in its broader aspects. We desire, therefore, that the appended claims shall be accorded the broadest construction consistent with their language and the prior art.

We claim as our invention:

1. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; means automatically responsive to a predetermined stage in the opening operation of the circuit breaker for deenergizing said tripping-means; means for reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

2. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; means for reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

3. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; means automatically responsive to a predetermined stage in the opening operation of the circuit breaker for deenergizing said tripping-means; means responsive to the opening of the circuit breaker for automatically reclosing the circuit breaker; means operative upon such occasions to insure that said line-energized voltage-circuit and said rectifier-means supply charging-voltage to said unidirectional-current bus at a temporarily increased ratio with respect to the line-voltage; and means automatically operative near the end of the closing-stroke of said reclosing means for restoring normal-charging-voltage conditions to said unidirectional-current bus.

4. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; circuit-means for at times energizing said tripping-means from said unidirectional-current bus; means responsive to the opening of the circuit breaker for automatically reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

5. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; means automatically responsive to predetermined fault-conditions on the alternating-current line for energizing said tripping-means from said unidirectional-current bus; means automatically responsive to a predetermined stage in the opening operation of the circuit breaker for deenergizing said tripping-means; means responsive to the opening of the circuit breaker for automatically reclosing the circuit breaker; means operative upon such occasions to insure that said line-energized voltage-circuit and said rectifier-means supply charging voltage to said unidirectional-current bus at a temporarily increased ratio with respect to the line-voltage; and means automatically operative near the end of the closing-stroke of said reclosing means for restoring normal charging-voltage conditions to said unidirectional-current bus.

6. A circuit-breaker system for an alternating-current line, comprising: a circuit breaker having main contacts in series with the line; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on one side of the main contacts of the breaker; rectifier-means for charging said capacitor from said line-energized voltage-circuit; means automatically responsive to predetermined fault-conditions on the alternating-current line for energizing said tripping-means from said unidirectional-current bus; means responsive to the opening of the circuit breaker for automatically reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

7. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on the bus side of the main contacts of the breaker; rectifier-means for charging said capacitor from said line-energized voltage-circuit; circuit-means for at times energizing said tripping-means from said unidirectional-current bus; means automatically responsive to a predetermined stage in the opening operation of the circuit breaker for deenergizing said tripping-means; means for reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

8. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a normally substantially unloaded unidirectional-current bus; a capacitor permanently connected across the terminals of said unidirectional-current bus; a line-energized voltage-circuit adapted to be energized from across the line on the bus side of the main contacts of the breaker; trickle-charging rectifier-means for charging said capacitor from said line-energized voltage-circuit; circuit means for at times temporarily energizing said tripping-means from said unidirectional-current bus; means for reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

9. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on the bus side of the main contacts of the breaker; rectifier-means for charging said capacitor from said line-energized voltage-circuit; circuit-means for at times energizing said tripping-means from said unidirectional-current bus; means automatically responsive to a predetermined stage in the opening operation of the circuit breaker for deenergizing said tripping-means; means responsive to the opening of the circuit breaker for automatically reclosing the circuit breaker; means operative upon such occasions to insure that said line-energized voltage circuit and said rectifier-means supply charging-voltage to said unidirectional-current bus at a temporarily increased ratio with respect to the line-voltage; and means automatically operative near the end of the closing-stroke of said reclosing means for restoring normal charging-voltage conditions to said unidirectional-current bus.

10. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a normally substantially unloaded unidirectional-current bus; a capacitor permanently connected across the terminals of said unidirectional-current bus; a line-energized voltage-circuit adapted to be energized from across the line on the bus side of the main contacts of the breaker; trickle-charging rectifier-means for charging said capacitor from said line-energized voltage-circuit; circuit-means for at times temporarily energizing said tripping-means from said unidirectional-current bus; means responsive to the opening of the circuit breaker for automatically reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

11. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a unidirectional-current bus; a capacitor permanently connected across the terminals of said unidirectional-current bus; a line-energized voltage-circuit adapted to be energized from across the line on the bus side of the main contacts of the breaker; rectifier-means for charging said capacitor from said line-energized voltage-circuit; means automatically responsive to predetermined fault-conditions on the alternating-current line for energizing said tripping-means from said unidirectional current bus; means automatically responsive to a predetermined stage in the opening operation of the circuit breaker for deenergizing said tripping-means; means responsive to the opening of the circuit breaker for automatically reclosing the circuit breaker; means operative upon such occasions to insure that said line-energized voltage-circuit and said rectifier-means supply charging-voltage to said unidirectional-current bus at a temporarily increased ratio with respect to the line-voltage; and means automatically operative near the end of the closing-stroke of said reclosing means for restoring normal charging-voltage conditions to said unidirectional-current bus.

12. In an electrical station including an alternating-current power-bus and at least one end of an alternating-current power-line: a circuit breaker having main contacts for connecting and disconnecting said power-line to and from said power-bus; electrical tripping-means for tripping said circuit-breaker to actuate the latter to an open-circuit condition; a normally substantially unloaded unidirectional-current bus; a capacitor permanently connected across the terminals of said unidirectional-current bus; a line-energized voltage-circuit adapted to be energized from across the line on the bus side of the main contacts of the breaker; trickle-charging rectifier-means for charging said capacitor from said line-energized voltage-circuit; means automatically responsive to predetermined fault-conditions on the alternating-current line for temporarily energizing said tripping-means from said unidirectional-current bus; means responsive to the opening of the circuit breaker for automatically reclosing the circuit breaker; and means automatically effective during the closing operation of the circuit breaker for causing said line-energized voltage-circuit and said rectifier-means to supply charging-voltage to said unidirectional-current bus at a temporarily increased ratio with respect to the line-voltage.

13. The combination, with an alternating-current line, of a normally substantially unloaded unidirectional-current auxiliary bus, rectifying-means, circuit-means for supplying a relatively small unidirectional charging-current at a predetermined voltage-ratio from said alternating-current line to said auxiliary bus through said rectifying-means, circuit-means for temporarily connecting a relatively heavy-current electrical load-device across said auxiliary bus, circuit-means for connecting a capacitor across said auxiliary bus, whereby, when said load-device is connected at times of failing charging-voltage, said capacitor discharges into said load-device, and means automatically responsive to conditions resulting in such a discharge of the capacitor into said load-device for temporarily thereafter increasing the voltage-ratio of said unidirectional charging-current.

14. A circuit-breaker system for an alternating-current line, comprising: a circuit breaker having spring-opened main contacts in series with the line; trip-circuit means for tripping said circuit-breaker to cause the latter to become actuated to an open-circuit condition; closing-circuit means for performing an operation necessary to the reclosure of said circuit-breaker; a normally substantially unloaded unidirectional-current bus; a capacitor permanently connected across the terminals of said unidirectional-current bus; trickle-charging rectifier-means for charging said capacitor; tripping-controlling means, including a fault-responsive relay responsive to predetermined fault-conditions on the alternating-current line, for effecting a circuit-closing operation in said trip-circuit means; sealing-in means, responsive to a response of a fault-responsive relay, for establishing a holding-contact in parallel-circuit relation to the circuit-closing operation of said fault-responsive relay; auxiliary switching-means for quickly thereafter open-circuiting said trip-circuit means; closing-controlling means for at times effecting a momentary circuit-closing operation in said closing-circuit means; circuit-means energized from said unidirectional-current bus for energizing said trip-circuit means; alternating-current line-energized voltage-circuit-means, energized from across the line on one side of the main contacts of the breaker, for supplying the energy for said trickle-charging rectifier-means; line-energized voltage-circuit-means, energized from across the line on one side of the main contacts of the breaker, for supplying the energy for the reclosure of said circuit-breaker, independently of said trickle-charging rectifier-means and independently of said unidirectional-current bus; and circuit-changing means, operative at times when the circuit-breaker is open, for supplying an effective charging-voltage to said capacitor at a temporarily increased ratio with respect to the line-votage.

15. The combination, with an alternating-current line, of a normally substantially unloaded unidirectional-current auxiliary bus, rectifying-means, circuit-means for supplying a relatively small unidirectional current at a predetermined voltage-ratio from said alternating-current line to said auxiliary bus through said rectifying-means, circuit-means for temporarily connecting a relatively heavy-current electrical load-device across said auxiliary bus, circuit-means for connecting a reactance-device across said auxiliary bus, whereby, when said load-device is connected at times of failing line-voltage, said reactance-device discharges into said load-device, and means automatically responsive to conditions resulting in such a discharge of the reactance-device into said load-device for temporarily thereafter increasing the voltage-ratio of said unidirectional current.

16. A circuit breaker system for an alternating current line comprising, a circuit breaker, operating means for said circuit breaker including electrical tripping means for tripping said breaker to cause opening thereof, a capacitor, circuit means including a rectifier means for storing electrical energy derived from said line in said capacitor, circuit means for at times energizing said tripping means from said capacitor to cause opening of the breaker, and means automatically effective during a closing operation of the breaker for temporarily increasing the rate at which energy is stored in said capacitor.

LLOYD W. DYER.
GAYNE D. GAMEL.